United States Patent

[11] 3,563,518

| [72] | Inventors | John Victor Alderson<br>Southport;<br>Robert Smith, Ormskirk; Geoffrey Wells,<br>Burscough, England |
|---|---|---|
| [21] | Appl. No. | 819,618 |
| [22] | Filed | Apr. 28, 1969 |
| [45] | Patented | Feb. 16, 1971 |
| [73] | Assignee | Pilkington Brothers Limited<br>Liverpool, England |
| [32] | Priority | May 2, 1968 |
| [33] | | Great Britain |
| [31] | | 20951/68 |

[54] CONTINUOUS HEAT TREATMENT OF MATERIALS
14 Claims, 3 Drawing Figs.

[52] U.S. Cl. ..................................................... 263/12
[51] Int. Cl. ..................................................... F27b 14/00

[50] Field of Search ........................................... 263/12, 13;
65/335, 339

[56] References Cited
UNITED STATES PATENTS

| 1,928,598 | 9/1933 | Morton et al. ................ | 65/335X |
| 2,044,616 | 6/1936 | Kinker ......................... | 263/12 |

Primary Examiner—John J. Camby
Attorney—Morrison, Kennedy and Campbell

ABSTRACT: A continuous stream of molten glass or glass fibers is produced by continuously and evenly distributing glass-forming materials onto a hearth, exposing the materials to high temperature to convert the materials into molten glass, and continuously and progressively removing the molten glass upwardly from the hearth by means of suction at the same rate at which materials are distributed onto the hearth.

Inventors
JOHN VICTOR ALDERSON, ROBERT SMITH and GEOFFREY WELLS

3,563,518

CONTINUOUS HEAT TREATMENT OF MATERIALS

BACKGROUND OF THE INVENTION

1. Field of the Invention

The present invention relates to the continuous heat treatment of materials, for example for producing a continuous stream of molten glass, and to a furnace for use in the continuous heat treatment of materials.

2. Description of the Prior Art

In our copending U.S. Pat. application No. 712,559 filed on Mar. 12, 1968, there is described a method of producing a continuous stream of molten glass comprising continuously and evenly distributing glass-forming materials onto a hearth, exposing the glass-forming materials onto the hearth to high temperature while said materials remain stationary relative to the hearth thereby continuously converting the said materials into molten glass, and continuously and progressively removing the molten glass from the hearth at the same rate at which the materials are distributed on the hearth.

In the aforesaid U.S. Pat. application, the preferred method of removing the molten glass from the hearth is to direct the molten glass off the outer edge of the hearth by means of a scraper blade, and the molten glass then falling into an outlet channel as a continuous stream. With this method it is necessary to use a hearth which has a substantially flat outer rim, and consequently the depth of molten glass on the hearth must be small enough for surface tension in the molten glass to prevent this from flowing off the flat outer rim of the hearth except when directed off by the scraper blade. This limitation on the depth of molten glass may place an undesirable limitation on the output of molten glass that can be produced in this way.

SUMMARY

According to one aspect of the present invention, a method of producing a continuous stream of molten glass comprises continuously and evenly distributing glass-forming materials onto a hearth, exposing the glass-forming materials on the hearth to high temperature while said materials remain stationary relative to the hearth thereby continuously converting the said materials into molten glass, and continuously and progressively removing the molten glass upwardly from the hearth by means of suction at the same rate at which materials are distributed onto the hearth.

Preferably, as in the aforesaid copending U.S. Pat. application, the glass-forming materials are distributed onto an annular area of hearth, and the hearth is rotated in a horizontal plane so as to move the glass-forming materials along a circular path while exposing the materials to a high temperature, thereby continuously converting the materials into molten glass during less than one revolution of the hearth, the molten glass being retained on the hearth by means of a raised flange on the outer rim thereof.

The term "stationary relative to the hearth" is to be understood to means that there is very little relative movement between the hearth and the layer of glass thereon so that all the glass undergoes the same closely controlled heating cycle.

The method of this invention may also include the step of scraping the glass off the hearth before removing the glass by suction.

The glass-forming materials distributed on the hearth are preferably pellets of mixed and compacted bath, which are completely converted into molten glass during less than one revolution of the hearth. The glass-forming materials may however be prereacted batch or glass itself.

According to another aspect of the invention, there is provided a furnace comprising a heating chamber, a refractory hearth disposed horizontally in the heating chamber, delivery means for continuously and evenly distributing materials to be heated on the hearth, discharge means mounted in fixed relationship to the said delivery means, said discharge means including a discharge conduit extending from the vicinity of the hearth to an outlet below the hearth level, means for applying suction to said conduit for drawing molten material upwardly from the hearth into the said conduit, and means for providing relative movement between the hearth and the delivery and discharge means.

The hearth may be circular and include a raised flange on its outer rim, in which case the relative movement between the hearth and the delivery means and discharge means will be relative rotation.

In a preferred form of the invention, the circular hearth is mounted on a rotatable member disposed within the heating chambers, and the delivery and discharge means are stationary.

Preferably the hearth is annular and is provided with raised flanges on both its inner and outer edges. Since the molten material is removed upwardly these flanges do not interfere with its removal. The flanges allow a greater depth of molten material to be retained on the hearth than can be retained on a hearth having a flat outer rim, so allowing a greater output from the same area of hearth.

The discharge conduit may include at its inlet and hear the hearth a rearward wall having is lower end associated with a scraper in near contact with the hearth, the remaining walls of the conduit at the inlet end having their lower edges slightly spaced from the hearth. By "rearward" wall is meant the wall at the side of the conduit which is last to come into contact with the molten material on the hearth.

Since the speed at which the molten material arrives at the discharge conduit will vary in proportion to the radial position of the material on the hearth, the discharge conduit must remove the material more quickly from the outermost areas of the hearth than from the innermost areas. In order so to regulate the rate of removal, discrete openings may be provided between the scraper and the lower edge of the front wall of the inlet end of the conduit, these openings having areas which increase in size from the inner edge to the outer edge of the annular hearth.

The discharge conduit may be supported in the furnace by a tube of refractory material extending over the hearth and supported at the sides of the furnace. In a preferred arrangement the tube carries a refractory moulding in which is fitted the main part of the discharge conduit.

In order for glass flow to be initiated by applying suction to the discharge conduit, the outlet end of said conduit must be sealed. This seal is preferably maintained by a reservoir of molten material, the outlet end of the discharge conduit opening below the liquid level in this reservoir. Alternatively, the seal may be maintained by a bushing from which glass fibers may be drawn, and in which a reserve of molten glass is maintained.

The invention further includes molten glass or glass fibers produced by the method described above.

DESCRIPTION OF THE PREFERRED EMBODIMENT

Figure 1:
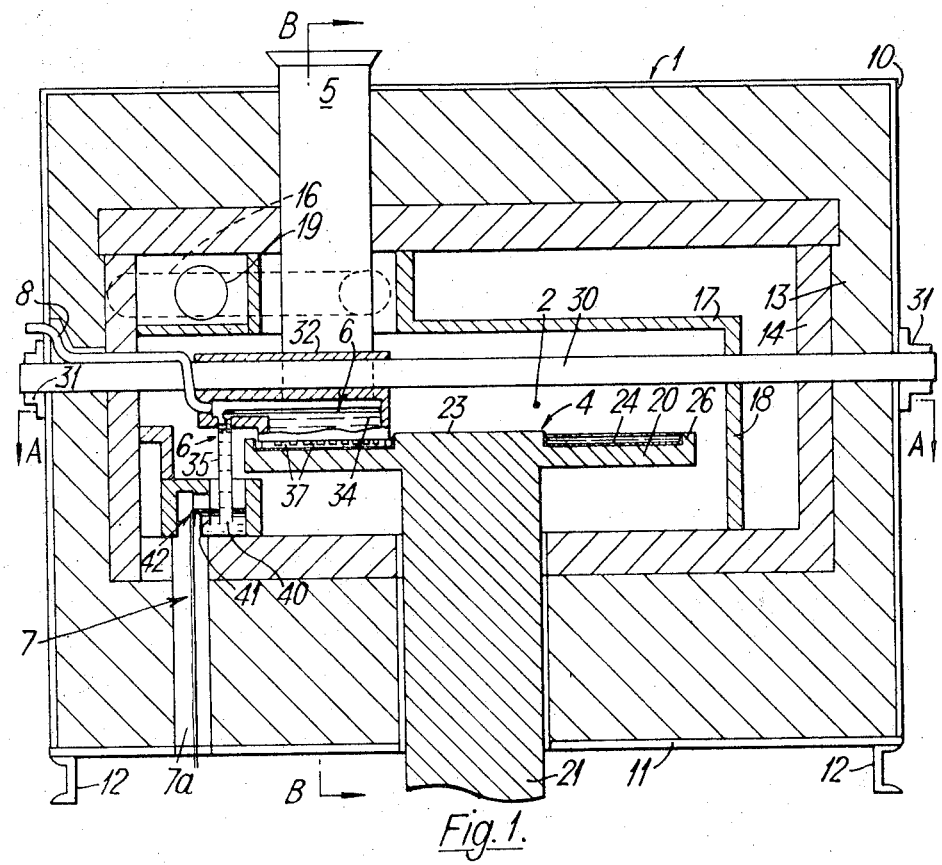
FIG. 1 is a sectional elevation by way of example of a glass melting furnace.

Referring to the drawings, the furnace 1 comprises a circular heating chamber 2, a rotary member 4 carrying an annular refractory hearth disposed horizontally within the heating chamber, said rotary member being supported and rotated by means (not shown) situated below the furnace, delivery means in the form of a chute 5 by which batch may be distributed onto the hearth as the hearth rotates, and discharge means including a discharge conduit 6 extending from the vicinity of the hearth to an outlet 7 below the level of the hearth, and a tube 8 through which suction may be applied to the conduit for drawing molten glass upwardly from the hearth into the conduit.

The furnace 1 is enclosed within a steel casing 10 which includes base plate 11, this base plate being rigidly supported by channel members 12 attached to supporting columns (not shown). The furnace is lined with an outer layer 13 of insulating and refractory brick and an inner layer 14 of sillimanite. The heating chamber 2 is heated by gas burners 16, which produce hot combustion products circulating over a refractory muffle 17, 18 and leaving the furnace by flue 19. The muffle 17, 18 radiates heat into the chamber 2 while excluding the products of combustion therefrom, and the muffle portion 17 is horizontally disposed above the rotary member 4 so as to radiate heat directly onto a charge thereon while the upper surface of the muffle is heated by burners 16. The furnace is capable of maintaining a temperature of 1500° C. in chamber 2.

The rotary member 4 comprises a sillimanite moulding having a disc portion 20 integral with a shaft 21. The hearth constituted by the upper surface of disc portion 20 has a horizontal annular surface with a raised central boss 23 and with a raised flange 26 at its outer rim. This hearth is overlaid with a refractory hearth plate 24 of platinum rhodium alloy 0.02 inch thick. This hearth plate 24 has a raised flange at its inner edge in contact with the raised boss 23, and another raised flange on its outer periphery in contact with flange 26.

The shaft 21 extends vertically through a circular hole in the base of the furnace, and is supported in a hub which is rotatable in a roller bearing by a geared motor, which features are not shown but which are the same as those described in our copending U.S. Pat. application No. 712,559.

Figure 2:
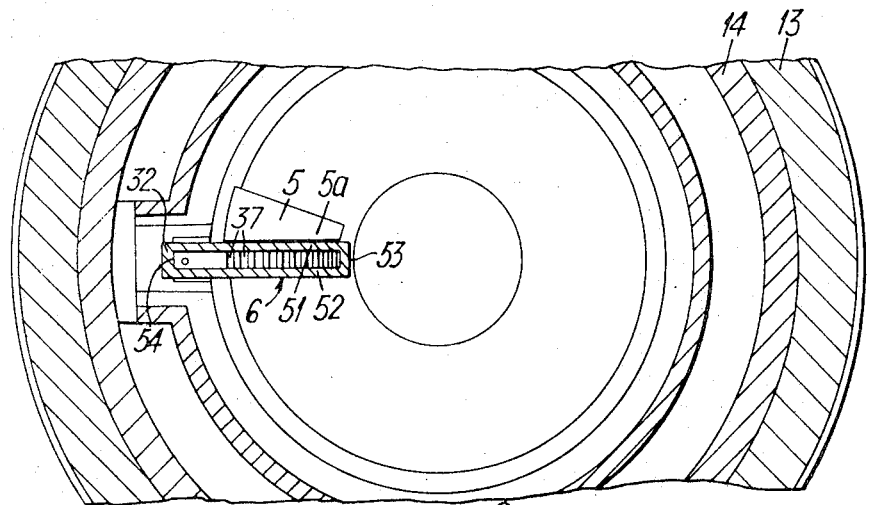
FIG. 2 is a fragmentary sectional plan view across plane AA of FIG. 1.
Figure 3:
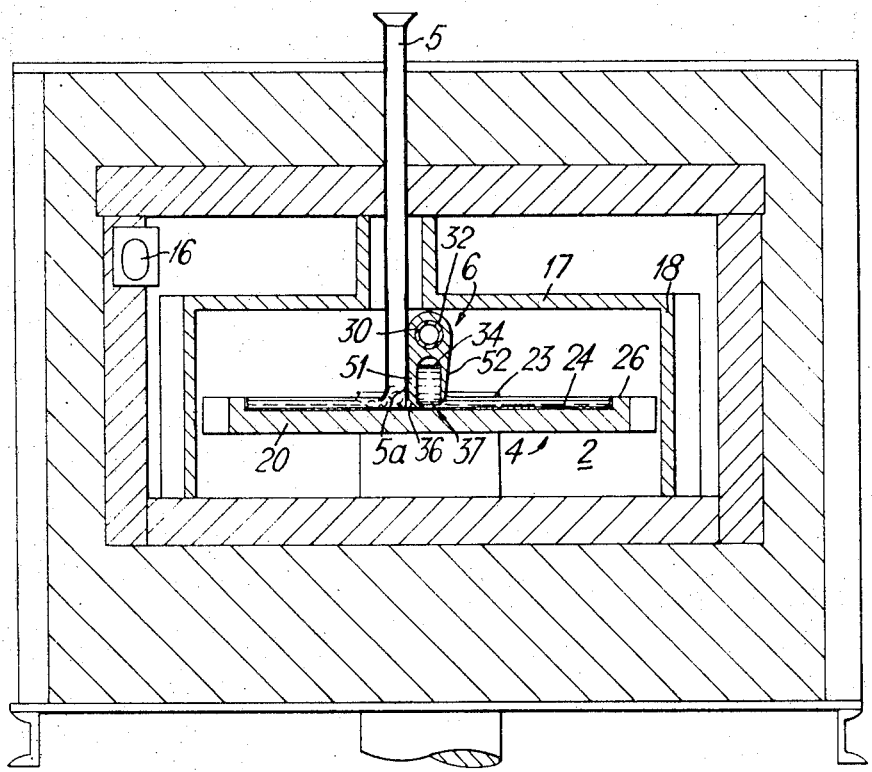
FIG. 3 is a sectional elevation across plane BB of FIG. 1.

The chute 5, which is of trapezoidal cross section, extends through the roof of the furnace and is positioned so as to deliver batch onto a radial segment of the hearth plate 24. The chute 5 forms the only vent from the chamber 2. The chute 5 is of platinum rhodium alloy and diverges so that its lower end forms a segment shaped enclosure as shown in FIG. 2. As shown in FIG. 3 the front wall 5a of this enclosure extends downwardly nearly into contact with the hearth to prevent batch from being sucked back into the discharge conduit to be described.

Mounted immediately adjacent to the delivery means is a discharge conduit indicated generally at 6, which removes the molten glass formed on the hearth after the glass-forming materials have been carried around the heating chamber 2. The discharge conduit is supported in the furnace by a tube 30 of refractory material extending horizontally over the hearth and secured at its ends to the sides of the furnace casing by bearings 31. The tube 30 carries a refractory moulding 32, in which is fitted the main inlet part 34 of the discharge conduit which is a vertically disposed flat boxlike section having sidewalls 51, 52, 53 and 54.

The discharge conduit also includes a down tube 35 communicating with inlet part 34, and the discharge conduit comprising parts 34 and 35 is airtight except for a tube 8 communicating with the conduit intermediate these parts. This tube 8 extends upwardly out of the side of the furnace, where it is connected to a source of vacuum.

As shown in FIG. 3, the lower edge of section 34 is associated with a scraper blade 36 which slopes downwardly from the lowest extremity of rearward wall 51 and has its lower edge nearly in contact with the hearth plate 24, the remaining walls 52, 53, 54 of the inlet end of the conduit having their lower edges spaced from the hearth. When molten glass is carried by the hearth under the section 34, the scraper forces the glass upwards to fill the lower inlet end of the discharge conduit.

The lower edge of the front wall 52 of the inlet end of the conduit has extensions joined to the scraper blade 36, leaving discrete openings 37 therebetween. These openings 37 allow a greater rate of glass removal at the outer edge of the hearth than at the inner edge, so that the rate of glass removal from the hearth is made proportional to the rate at which it arrives at the discharge means.

The outlet 7 includes a reservoir 40 formed of refractory metal, and having a partition 41. The outlet 42 from the reservoir 40 is so positioned that molten glass only flows therefrom which the liquid level attains a specified level, and the tubular conduit section 35 is extended downwardly so that its outlet end is below this specified level. By this arrangement, once the reservoir 40 has been filled to its outlet level, a liquid seal prevents ingress into the furnace of cold air through the outlet, and also enables a vacuum to be applied to the discharge conduit in the initial stages of operation.

An outlet passage 7a extends downwardly through the furnace base from the outlet from the reservoir 40, allowing free flow of molten glass therethrough.

In operation, pellets of mixed batch are fed in through the chute 5 at a controlled rate, and on contacting the hot hearth the batch starts to react. Vigorous reaction of the batch is confined to the area of the hearth plate enclosed by the lower end of chute 5, and the chute also serves to exhaust gases produced by the reacting batch.

The reacting batch is carried around the heating chamber 2 by the hearth and converted into a layer of molten glass on the hearth, retained thereon by the inner an outer flanges.

As the molten glass reaches the scraper 36 this scrapes the molten glass off the hearth plate 24, so that the molten glass is forced upwardly to fill the inlet end of the discharge conduit. Controlled suction is applied by the vacuum means attached to pipe 8, and this draws the molten glass upwardly from the hearth as a continuous stream which passes along the horizontal part of the conduit and then passes gradually down the down tube 35 to the outlet 7. Since the outlet 7 is below the hearth level, once a continuous stream of molten glass is established along the conduit this continues to flow as a siphon, without any stagnant pockets being established.

It will be understood that for the suction to be applied initially, it is necessary for molten glass to already be present in the reservoir 40 to provide the liquid seal at the lower end of the conduit.

Glass flow through the discharge conduit is adjusted by regulation of the vacuum applied to tube 8, such that glass extraction rate is just equal to the rate of glass production. With this arrangement small errors in the vacuum adjustment are unimportant because an increase in glass level on the hearth raises the level within the inlet section 34 of the discharge conduit, and so increases the rate at which the glass flows therethrough into down tube 35.

As described in our copending U.S. Pat. application No. 712,559 various modifications to the furnace may be envisaged. For example, the furnace may be used for production of glass fibers, in which case the starting material will be glass marbles. The term "glass forming materials" includes such materials as glass marbles. Since the glass marbles will not react on contacting the hearth plate, the chute 5 need not in that case also serve as an exhaust flue.

With glass-forming materials which give rise to the formation of a silica scum on top of the molten glass, a comblike device may be suspended within the chamber so that the teeth thereof protrude into the scum layer. Such a device may also be used to prevent bubbles adhering to the surface of the hearth plate.

The process and installation as described may be adapted for electrical heating. One form of electrical heating may be provided by silicon carbide elements mounted around the sides of the furnace enclosure. Another method of electrical heating which may be used is to pass a heavy electrical current through the platinum plate 24 by means of conductors brought out of the furnace through the shaft 21. A further possibility is direct resistance heating of the molten glass itself, using the plate 24 as one electrode and having further electrodes dipping into or making contact with the top surface of the glass. The heating means may be arranged to give several zones of heating at different temperatures, whereby the glass can be processed through a closely controllable time/temperature cycle.

We claim:

1. A method of producing a continuous stream of molten glass comprising continuously and evenly distributing glass-forming materials onto a hearth, exposing the glass-forming materials on the hearth to high temperature while said materials remain stationary relative to the hearth thereby continuously converting the said materials into molten glass, and removing the molten glass upwardly from the hearth by means of suction as a continuous stream at the same rate at which materials are distributed onto the hearth.

2. A method of producing a continuous stream of molten glass comprising continuously feeding glass-forming materials onto an annular area of hearth, rotating the hearth in a horizontal plane to move the glass-forming materials along a circular path while exposing the glass-forming materials to high temperature thereby continuously converting the said materials into molten glass during less than one revolution of the hearth, retaining the molten glass on the hearth by means of a raised flange on the outer rim thereof, and then removing the molten glass upwardly from the hearth by means of suction as a continuous stream at the same rate at which the materials are distributed onto the hearth.

3. A method according to claim 1, including the step of scraping the glass off the hearth before removing the glass by suction.

4. A method according to claim 1, wherein the glass-forming materials distributed on the hearth are in the form of pellets of mixed and compacted batch.

5. A furnace comprising a heating chamber, a refractory hearth disposed horizontally in the heating chamber, delivery means for continuously and evenly distributing materials to be heated onto the hearth, discharge means mounted in fixed relationship to the said delivery means, said discharge means including a discharge conduit extending from the vicinity of the hearth to an outlet below hearth level, means for applying suction to said conduit for drawing molten material upwardly from the hearth into the said conduit, and means for providing relative movement between the hearth and the delivery and discharge means.

6. A furnace according to claim 5, wherein the hearth is circular and includes a raised flange on its outer rim, and in which the relative movement between the hearth and the delivery and discharge means is relative rotation.

7. A furnace according to claim 6, wherein the hearth is mounted on a rotatable member disposed within the heating chamber, and in which the delivery means and discharge means are stationary.

8. A furnace according to claim 6, wherein the hearth is annular and is provided with raised flanges on its inner and outer edges.

9. A furnace according to claim 5, wherein the discharge conduit includes at its inlet end near the hearth a rearward wall having its lower end associated with a scraper in near contact with the hearth, the remaining walls of the conduit at said inlet end having their lower edges slightly spaced from the hearth.

10. A furnace according to claim 9, wherein discrete openings are provided between the scraper and the lower edge of the front wall of the inlet end of the discharge conduit, these openings having areas which increase in size from the inner edge to the outer edge of the annular hearth.

11. A furnace according to claim 5, wherein the discharge conduit is supported in the furnace by a tube of refractory material extending over the hearth and supported at the sides of the furnace.

12. A furnace according to claim 11, wherein the tube carries a refractory moulding in which is fitted the main part of the discharge conduit.

13. A furnace according to claim 5, including at its outlet a reservoir for molten material, and in which the outlet end of the discharge conduit is below the liquid level of said reservoir.

14. A furnace according to claim 5, wherein the outlet includes a bushing from which glass fibers may be drawn and which is capable of retaining a reserve of molten glass.